United States Patent
Coleman et al.

[11] Patent Number: 5,916,398
[45] Date of Patent: Jun. 29, 1999

[54] SUSPENSION LAMINATION METHOD AND DEVICE

[75] Inventors: Charles R. Coleman, Pittsburgh; David L. Backfisch, Monroeville; John E. Smarto, Trafford, all of Pa.

[73] Assignee: PPG Industries Ohio, Inc., Cleveland, Ohio

[21] Appl. No.: 08/970,031

[22] Filed: Nov. 13, 1997

Related U.S. Application Data

[63] Continuation-in-part of application No. 08/648,463, May 15, 1996.

[51] Int. Cl.⁶ .............................. B32B 31/04; B32B 31/28
[52] U.S. Cl. .................. 156/228; 156/102; 156/273.7; 156/275.5; 156/275.7; 156/295; 156/73.6; 269/21
[58] Field of Search ................ 156/99, 102, 228, 156/273.7, 275.5, 275.7, 285, 295, 379.8, 380.9, 581, 583.1; 269/21; 351/166, 177

[56] References Cited

U.S. PATENT DOCUMENTS

| | | | |
|---|---|---|---|
| 2,394,721 | 2/1946 | Simmons et al. | 88/57 |
| 2,597,543 | 5/1952 | Suben | 51/235 |
| 3,134,208 | 5/1964 | Richmond | 51/235 |
| 4,268,134 | 5/1981 | Gulati et al. | 351/163 |
| 4,287,018 | 9/1981 | Gulati et al. | 156/645 |
| 4,498,919 | 2/1985 | Mann | 65/30.11 |
| 4,576,623 | 3/1986 | Mann | 65/30.14 |
| 4,645,317 | 2/1987 | Frieder et al. | 351/164 |
| 4,679,918 | 7/1987 | Ace | 351/163 |
| 4,781,452 | 11/1988 | Ace | 351/177 |
| 4,793,703 | 12/1988 | Fretz, Jr. | 351/163 |
| 4,883,548 | 11/1989 | Onoki | 156/99 |
| 4,927,480 | 5/1990 | Vaughn | 156/228 |
| 4,969,729 | 11/1990 | Merle | 351/168 |
| 5,162,825 | 11/1992 | Kamekura et al. | 351/163 |
| 5,187,505 | 2/1993 | Spector | 351/159 |
| 5,259,169 | 11/1993 | Appelbaum et al. | 53/373.8 |
| 5,323,192 | 6/1994 | Howland et al. | 351/177 |
| 5,343,260 | 8/1994 | Henry et al. | 351/159 |
| 5,351,100 | 9/1994 | Schwenzfeier et al. | 351/164 |
| 5,399,227 | 3/1995 | Abrams | 156/539 |
| 5,433,810 | 7/1995 | Abrams | 156/273.7 |
| 5,503,694 | 4/1996 | Abrams | 156/64 |

FOREIGN PATENT DOCUMENTS

| | | |
|---|---|---|
| 6-49600 | 6/1991 | Japan . |
| 5-24872 | 2/1993 | Japan . |

*Primary Examiner*—Michael W. Ball
*Assistant Examiner*—Michael A. Tolin
*Attorney, Agent, or Firm*—William C. Mitchell

[57] ABSTRACT

A device and method for forming a composite from a pair of parts via suspension lamination is disclosed. The device bonds members with opposed mating surfaces and has a base and a vertical column mounted on the base. The vertical column supports a vertical cylinder. A vertically adjustable head assembly for holding an upper part is located at the lower end of the vertical cylinder and is operatively connected to a drive motor at the upper end of the vertical cylinder. A vacuum generator generates a negative pressure to hold the upper part on the head assembly. A nest member is located below and coaxially with the head assembly for supporting a lower part. The upper and lower parts are optionally laterally aligned via an alignment means and a curing medium is provided to the aligned parts to cure an adhesive composition which is spread over the opposed mating surfaces of the parts to form a composite of the parts. Curing occurs while the lower part is suspended from the upper part via surface tension.

7 Claims, 8 Drawing Sheets

SUSPENSION LAMINATION METHOD AND DEVICE

This is a Continuation-in-Part of U.S. Ser. No. 08/648,463, filed May 15, 1996.

BACKGROUND OF THE INVENTION

1. Field of the Invention

This invention relates generally to a device and method for laminating first and second parts via a suspension lamination technique. In the instant method, a laminating adhesive film disposed between the mating surfaces of the parts to be laminated is cured while one of the parts is suspended from the other via surface tension and/or capillary attraction. The adhesive may be, for example, an ion-conducting polymer used in electrochromic applications. This method and device generally distributes an adhesive film evenly between the mating surfaces of the parts and facilitates accurate alignment of the parts prior to curing.

2. Description of the Prior Art

The formation of a composite eyeglass lens by bonding front and rear lenses together is disclosed in U.S. Pat. No. 5,399,227. That bonding process involves placing an adhesive on the concave surface of the front lens; pressing the convex surface of the rear lens against the adhesive on the front lens to evenly spread the adhesive throughout the gap between the two lenses and permitting the adhesive to set to bond the lenses together. This process forms a composite lens which may be trimmed to fit within an eyeglass frame and which may be further processed if desired.

U.S. Pat. No. 5,433,810 also discloses an eyeglass lens lamination method and apparatus which involves pressing lenses together to spread an adhesive between them. The adhesive is cured while the lenses are pressed together.

An apparatus for aligning and laminating the upper and lower lenses of a composite eyeglass lens is disclosed in Japanese Patent Application No. Hei 5[1993]-24872 and in Japanese Patent Application No. Hei 6[1994]-49600. The apparatus disclosed in these applications includes upper and lower lens retaining members. Each lens is held in its respective retaining member by a vacuum and the retaining members are moveable. The apparatus includes aligning members which move laterally relative to the vertical axes of the lens retaining members to contact the peripheral edges of the lenses to align the axes thereof. Each aligning member has a contact end to contact the peripheral edges of the lenses with a predetermined force.

In operation, the upper retaining member picks up the lower lens and moves laterally to place the lower lens on the lower retaining member. The lower lens is aligned with the axis of the lower retaining member by the aligning members after which the aligning members are withdrawn and the lower lens is held in place on the lower retaining member by a vacuum. A bonding agent is applied to the center of the lower lens. The upper retaining member picks up the upper lens and aligns it with the axis of the lower lens. The upper lens is then lowered until it touches the bonding agent on the lower lens after which the aligning members continue to move laterally inwardly to contact the peripheral edges of the upper and lower lenses to axially align them. The aligning members are then withdrawn and the upper retaining member is lowered and the composite lens is removed after the bonding agent sets.

SUMMARY OF THE INVENTION

The laminating device and method of the present invention are directed to suspension lamination of complimentary parts. The device includes a nest member for holding the bottom surface and/or edge(s) of a lower part prior to lamination and a head assembly for holding the top surface of an upper part. The vertical axes of the nest member and the head assembly are preferably aligned. Initially, both the nest member and the head assembly are subjected to a negative pressure from one or more vacuum generators to maintain their respective parts in position.

An effective amount of an adhesive composition, which may comprise a polymerizable monomer or monomers, an initiator, and, optionally, various non-reactive diluents or additives, is placed between the mating surfaces of the parts either manually or by an automatically controlled supply conduit. This is generally accomplished by adding the adhesive composition to the mating surface of the lower part. when the mating surface of the upper part contacts the adhesive composition, the composition spreads substantially over the entire mating surface of the lower part and the entire mating surface of the upper part as a thin film by capillary action and/or surface tension forces and/or by mechanical action induced by closure of the distance between the parts. It is desirable to achieve a predetermined adhesive layer thickness and to avoid edge contamination by precisely controlling the amount of adhesive composition added to the mating surface of the lower part and by controlling the spacing between the mating surfaces.

During the curing step (e.g., polymerization), the complimentary parts are held together by surface tension and/or the capillary action of the adhesive composition between the parts. Thus, after the adhesive composition is spread between the parts, vacuum on the lower part is released and the upper head assembly and the lower nest assembly are separated, preferably by raising the upper head assembly. This enables the lower part to be suspended by the surface tension and/or capillary action of the adhesive composition between the upper and lower parts; curing then occurs while the lower part is suspended from the upper part. This suspension curing or suspension lamination technique is not known or suggested in the art and results in improved optics relative to composite lenses so cured.

Initially, vacuum at the nest member is provided on the bottom surface of the lower part to secure the lower part and to prevent premature lifting of the lower part from the nest member by surface tension and/or capillary forces. When the lower vacuum is released, these forces suspend the lower part from the upper part, which facilitates curing or setting of the adhesive composition while the lower part is in a suspended state.

Optionally, the lower part and the upper part are laterally adjusted by alignment means to align the vertical axes of the parts while the parts are held on the head assembly. For example, a plurality of pneumatically or electrically operated cylinders having radially adjustable contact discs in an alignment fixture can serve as alignment means. The adhesive composition, as it suspends the lower part via surface tension and/or capillary action, is then cured by exposure to an appropriate energy source for an effective time to bond the parts together, thereby forming a composite. After the adhesive is cured, vacuum at the upper head assembly is released and the composite is removed from the upper head for further processing. A non-transparent adhesive may be used for laminating parts which are not lenses.

A preferred embodiment of the invention provides an apparatus and a method for laminating shaped, complimentary lenses to form a composite eyeglass lens; electrochromic lenses are especially preferred. These transparent lenses, which may have various shapes, utilize a transparent, initiator-containing adhesive cured by exposure to an energy source such as visible or ultraviolet light. The invention is also applicable to the lamination of transparent or opaque parts using an adhesive cured by heat.

A complete understanding of the invention will be obtained from the following description when taken in connection with the accompanying figures of drawings wherein like reference characters identify like parts throughout.

DETAILED DESCRIPTION OF THE INVENTION

The instant invention is directed to a laminating device for forming a composite from an upper part and a lower part having opposed mating surfaces and from an adhesive composition, wherein said device comprises: a base; a vertical column extending upwardly from said base; a vertical cylinder having an upper end and a lower end, which cylinder is supported by said vertical column preferably via a horizontal cross member; a drive means mounted at the upper end of said vertical cylinder; a vertically moveable head assembly at the lower end of said vertical cylinder, wherein said head assembly includes a head member for supporting said upper part; a connecting means for connecting said drive means to said vertically moveable head assembly for moving said head assembly relative to said vertical cylinder; a means operatively connected with said head member for holding said upper part on said head member; a nest member coaxial with and below said head member for supporting said lower part; a means operatively connected with said nest member for holding said lower part on said nest member; optionally, a means for laterally aligning said lower part and said upper part; and a means located in close proximity to, preferably below, said head assembly for curing said adhesive composition when said composition is deposed between said upper and lower parts.

The aforesaid curing means is generally an energy source that initiates curing of an adhesive composition containing one or more curable or polymerizable monomers and a free radical initiator sensitive to the energy source. This adhesive composition is present between and/or on opposed mating surfaces of the upper part and the lower part and bonds the upper part and the lower part to form a composite.

Preferably, the upper part and the lower part are transparent lenses, and the adhesive composition used to bond these parts, before curing, comprises one or more monomers and an initiator which, when cured, form(s) a transparent adhesive polymer that bonds the upper and lower parts into a composite. In the case of electrochromic lenses, this polymer may also be an ion-conducting polymer. It is also preferred that, during curing, the lower part is suspended from the upper part by the surface tension and/or capillary action of the adhesive composition, and that curing occurs during suspension. If the lower lens is transparent, curing can be effectuated by use of an energy source situated below the lower lens, whereby the initiation energy (e.g., visible or UV light) passes through the lower lens to initiate polymerization of the adhesive composition.

In the laminating device of this invention, the vertically moveable head assembly may comprise a shank having a hollow axial bore, preferably with internal threads extending along at least a portion thereof, a base at the lower end of the shank, a head member attached to the base, said head member having a convex lower contact surface and a vacuum chamber formed therein in operative communication with the hollow axial bore, and one or a plurality of passages formed in the head member extending from the vacuum chamber to the lower contact surface of the head member. Preferably, a plurality of passages formed in the head member includes a central axial passage and a plurality of passages extending radially outward from the central passage; these passages permit formation of a vacuum at various points on the contact surface of the head member to hold a part on the contact surface.

The connecting means for connecting the aforementioned drive means to the vertically moveable head assembly is preferably threaded to the internal threads in the shank to connect the drive means to the head assembly. Further, the head assembly may include a radial bore in flow communication with the hollow axial bore in the shank and a connector in the radial bore for connecting the radial bore to a vacuum generator conduit.

This device may also include a flexible ring member affixed to the contact surface of the head member, said flexible ring member having a shaped opening formed therein to position a part having a periphery with substantially the same shape as the shaped opening in the flexible ring member on the contact surface of the head member to position the part so that the axis of the part is aligned with the axis of the hollow axial bore.

In the laminating device of this invention, the nest member for supporting a lower part may comprise a base, preferably a base which is substantially cylindrical, having an annular rim and a concave inner contact surface, a central vacuum passage in said base extending from the inner contact surface to a radial bore formed in the base, a connector in the radial bore for connecting the radial bore to a vacuum generator conduit, whereby a vacuum can be drawn at the inner contact surface of the base to hold a part in contact with the inner contact surface of the base. Further, the nest member may include a connecting means for attaching the nest member to the device. For example, the nest member may include a lower surface on the base opposite the contact surface and a magnetic sheet on the surface of the base opposite the contact surface for adjustably locating the nest member relative to the aforementioned head assembly. The nest member is preferably situated on the shutter means of the curing means, which facilitates displacement of the nest member during curing, thereby preventing the nest member from blocking the curing energy.

The means for curing the adhesive composition is preferably a light box which is situated, preferably mounted, near or on the base below the head assembly. The light box generally comprises an interior and a cover plate with an opening formed therein, a light source located in the interior, and a shutter means (e.g., a reciprocating or rotary shutter means) for opening and closing the opening in the cover plate to control the passage of light rays emitted from the light source.

Preferably, the shutter means include an adjustable shutter for controlling the time the light rays pass through the opening in the cover plate of the light box. The shutter means may also include a plurality of rollers mounted on the adjustable shutter. Rails attached to the light box receive these rollers. The shutter means may further include a reciprocating means which can be mounted on the light box and connected to the adjustable shutter for reciprocating the adjustable shutter relative to the light box. This mechanism opens and closes the opening in the coverplate to control the passage of light rays from the interior and also moves the nest member, which is preferably located on the adjustable shutter, out of the path of the light rays used to cure the adhesive composition.

Alternatively, the light box may simply include a cover plate having an opening formed therein, a light source inside the light box and adjustable shutter means for controlling the passage of light rays from said light box through the opening, wherein said shutter means includes a reciprocating or rotating shutter. Thus, the shutter may be retracted or rotated to expose the opening in the cover plate and allow passage of light. Light passage is interrupted when said shutter is extended over the opening in the cover plate.

If used, the means for reciprocating the shutter may comprise a pneumatic shutter cylinder having a head end, a rod end and a piston rod, a pneumatic control system having a source of air under pressure in flow communication with the head end and the rod end of the shutter cylinder, and a reversible spring loaded valve in flow communication with the head end and the rod end of the shutter cylinder and with the source of air. The piston rod, which is laterally moveable and extends from the pneumatic cylinder has a distal end connected to the adjustable shutter; retraction of the piston rod with the cylinder moves the adjustable shutter to an open position and extension of the piston rod out of the cylinder moves the adjustable shutter to a closed position. Thus air supplied to the rod end of the shutter cylinder when the reversible spring loaded valve is in a first position retracts the shutter to expose the opening in the cover plate of the light box and air supplied to the head end of the shutter cylinder when the reversible spring loaded valve is in a second position extends the cylinder to close the opening in the cover plate of the light box. Alternatively, the shutter cylinder may be an electric shutter cylinder.

The optional means for laterally aligning upper and lower parts can be used when tooling of the device does not provide acceptable alignment. A suitable alignment means may comprise a substantially horizontal table with a central opening formed therein mounted on the base and having an upper surface, a plurality of angularly spaced alignment assemblies mounted on the upper surface of said table, wherein each of the alignment assemblies includes a reciprocally moveable contact disc for contacting the peripheral edges of the parts to move the parts laterally into axial alignment, and a means for reciprocating each of said contact discs between an extended contact position and a retracted position, whereby each of the contact discs is in contact with the peripheral edges of the upper and lower parts when the contact discs are in the extended contact position. It is noteworthy that the contact discs may cause some adhesive material to be drawn to the edge(s) of one or both of the parts via capillary attraction. This 'wick' effect, if present, may or may not be critical in a given lamination application.

A suitable means for reciprocating each of the contact discs comprises a pneumatic cylinder having a rod end and a head end, a means for mounting each of said pneumatic cylinders on the upper surface of the table, a piston rod extending from the rod end of each of the pneumatic cylinders and a contact disc mounted on the distal end of each of the piston rods, whereby extension of angularly spaced piston rods moves the contact discs laterally into contact with the peripheral edges of the parts and retraction of the piston rods into the pneumatic cylinders moves the contact discs laterally away from the peripheral edges of the parts. Alternatively, electric cylinders can be used.

The instant laminating device may also include a pneumatic control system having a source of pressurized air, a first reversible spring loaded valve in flow communication with said source of air, a first manifold in flow communication with the head ends of the aforementioned plurality of pneumatic cylinders used to reciprocate alignment assemblies, a second manifold in flow communication with the rod ends of the alignment pneumatic cylinders, wherein the first reversible spring loaded valve controls the flow of air from said source of air to the first and second manifolds, a second reversible spring loaded valve in flow communication with a separate pneumatic cylinder used to reciprocate the aforementioned shutter, one or more vacuum generators in flow communication with the aforementioned head member and with the aforementioned nest member, an electric control circuit including actuating means for controlling said first and second reversible spring loaded valves and the vacuum generator(s), and one or more manual valves for controlling said vacuum generator(s).

The instant invention is further directed to a laminating device for forming a composite from a first member and a second member having opposed mating surfaces and from an adhesive composition disposed between the opposed mating surfaces of said first and second members, which device comprises: a base; a vertical member on said base; a vertically moveable shaft having an upper end and a lower end, wherein said vertically moveable shaft is supported by said vertical member; a drive means operatively connected to the upper end of said shaft for moving said shaft relative to said vertical member; a head assembly connected to the lower end of said shaft, wherein said head assembly supports the first member; a means for holding the first member on the head assembly; a nest member below the head assembly for supporting the second member; a means for holding the second member on the nest member; optionally, a means for laterally aligning the first member and the second member; and a means for curing said adhesive composition disposed between the opposed mating surfaces of the first and second members. In this device, the drive means lowers the first member toward the second member while the first and second members are held on the head assembly and nest member, respectively, thereby spreading the adhesive composition substantially over the opposed mating surfaces of the first and second members. After release of the second member from the nest member, the head assembly is raised, thereby suspending the second member via surface tension and/or capillary force or attraction of the adhesive composition. The adhesive is cured while the second member is suspended from the first member.

Alternatively, instead of lowering the first member toward the second member, one part can be raised toward the other or the parts can independently be moved toward each other. Also, the vertical member used to support the vertically moveable shaft can be an integral part of the base.

The instant invention is also directed to a method for laminating an upper part and a lower part, wherein the upper and lower parts have opposed complementary mating surfaces, which method comprises: a) retaining the lower part on a lower holder with its mating surface facing upwardly; b) retaining the upper part on an upper holder coaxially with said lower part with its mating surface facing the mating surface of said lower part; c) placing an effective amount of an adhesive composition system between the mating surfaces of the parts, preferably on the mating surface of the lower part; d) bringing the upper part and the lower part toward each other until the mating surfaces of the parts are spaced so as to allow the adhesive composition to spread between the mating surfaces of the parts; e) ceasing retention of the lower part on the lower holder; f) suspending the lower part from said upper part via surface tension and/or capillary force of the adhesive composition, preferably by raising the upper part thereby also raising said lower part via the surface tension and/or capillary force or alternatively by lowering the lower holder away from the lower part; and g) curing said adhesive composition by a curing mechanism, wherein curing occurs while the lower part is suspended from the upper part, thereby forming a composite in which said upper and lower parts are bonded by the cured adhesive composition.

As used herein with respect to the instant inventions, the term "adhesive composition" encompasses curable or polymerizable precursor adhesives, resins, and adhesive monomer systems that can, upon exposure to a suitable energy source, react to become an adhesive that permanently bonds the upper and lower parts. Generally, adhesive compositions are in liquid form and are 'puddled' onto the mating surface of the lower part. An effective amount should be used, i.e., that amount of adhesive composition necessary to provide the desired thickness of adhesive layer between the parts to be laminated and to effectively bond the upper and lower parts. Preferably such compositions contain free radical initiators sensitive to UV light, visible light, heat or other energy sources.

Generally, it is desirable that the precursor adhesive be added to the lower part in sufficient quantity to substantially cover the mating surfaces of the upper and lower parts at the desired thickness without intruding on to the edges of the parts used to make the laminated product. When the device to be laminated is an electrochromic device, the adhesive composition may comprise a resin or monomer which, when cured, forms a transparent ion-conducting polymer that also serves as an adhesive which bonds the upper and lower halves of the electrochromic device together.

Thus, the method of the present invention is a suspension lamination method, wherein the precursor adhesive is cured as it, through surface tension and/or capillary forces or attraction, suspends a lower part from an upper part. This method is especially useful in the preparation of laminated lenses where improved optics are desired and where it is desirable to lessen edge contamination and/or misalignment problems. Relative to lens manufacture, this method may be especially suitable when one of the lenses is a thin, flexible plano lens easily held from a semi-finished lens by capillary and/or surface tension forces.

In the instant method, a first lens is held in a suspended horizontal position by an adhesive precursor between it and a second lens, which in turn is held by an upper holder situated above the second lens. The contacting surfaces of the lenses are of substantially equal curvature. An effective amount of the precursor adhesive is placed on the lower lens, and the lenses are brought together, thereby spreading this composition between the lenses. The upper lens, while held on the upper holder, is preferably raised, thereby suspending the lower lens due to the surface tension and/or capillary action of the precursor adhesive, which is then cured using a suitable energy source.

A preferred.curing mechanism involves exposing an adhesive composition containing one or more monomers and a polymerization initiator, to energy such as UV or visible light for an effective time, usually for at least about 0.1 minute, thereby curing the precursor adhesive to bond said parts.

In one embodiment, the lower part is positively retained in position during the spreading of the precursor adhesive over the mating surfaces of the parts. This helps to prevent spontaneous lifting prior to completion of adhesion precursor distribution. The lower part is then released after the precursor adhesive has spread over the mating surfaces of the parts to form a curable film. Preferably, the parts are electrochromic half cells which can be used to form an electrochromic device. More preferably, the parts are coated lenses which can be used to form a coated electrochromic lens.

It is also preferred that the suspended composite be retained in a raised position during lateral alignment of said parts, if an alignment step is used.

The instant invention is also directed to a method for laminating a first member and a second member having opposed mating surfaces, which method comprises: retaining or positioning said first member in or on a first holding device in a lower position than said second member; retaining or positioning said second member coaxially above said first member in or on a second holding device; placing an effective amount of a curable adhesive composition between the mating surfaces of said first and second members, preferably on the mating surface of said first (lower) member; moving the first and second members toward each other until said members are sufficiently close that the adhesive composition spreads between the mating surfaces of the first member and the second member; releasing the first member from the first holding device; raising the second member and/or lowering the first holding device, thereby suspending the first member from the second member via surface tension and/or capillary forces of the curable adhesive composition; and curing the curable adhesive composition to form a laminated composite.

In this method, it is believed that the curable adhesive composition spreads over the mating surfaces of said parts, at least in part, by capillary action or via surface tension forces, though the inventors do not wish to be bound by any particular theory or mechanism. After suspending the first member, the members are optionally laterally aligned along the center lines of said first and second members prior to curing. As alignment alternatives, the aforementioned contact alignment means can be used, or alignment can be accomplished by vibrating the first member and the second member for an effective time using a suitable vibration means. Preferably, however, tooling is precise enough that use of alignment means is unnecessary.

By forming the laminated composite via the instant suspension lamination method, physical contact between the lower holding device and the lower member during curing is eliminated. This generally reduces optical distortion, especially when laminating thin, flexible lenses such as <2.0 mm, preferably <1.5 mm, plastic lenses.

The instant invention is further directed to composites prepared by the suspension lamination method described herein. In particular, the instant invention is directed to composites formed by suspension lamination of a matched pair of parts, preferably edged lenses. Thus, an edged semi-finished lens greater than about 4 mm, preferably greater than about 6 mm and most preferably greater than about 8 mm, thick is laminated to a matching plano lens about 0.5–2 mm, preferably about 0.8 to about 1.2 mm, thick by suspending the plano lens from the semi-finished lens via the surface tension of an adhesive composition, and then curing during suspension. As another example, a thin prescription lens with a minimum thickness <2.0 mm is laminated to the mating surface of a matching lens using the instant suspension lamination technique.

DESCRIPTION OF THE PREFERRED EMBODIMENTS

Figure 1:
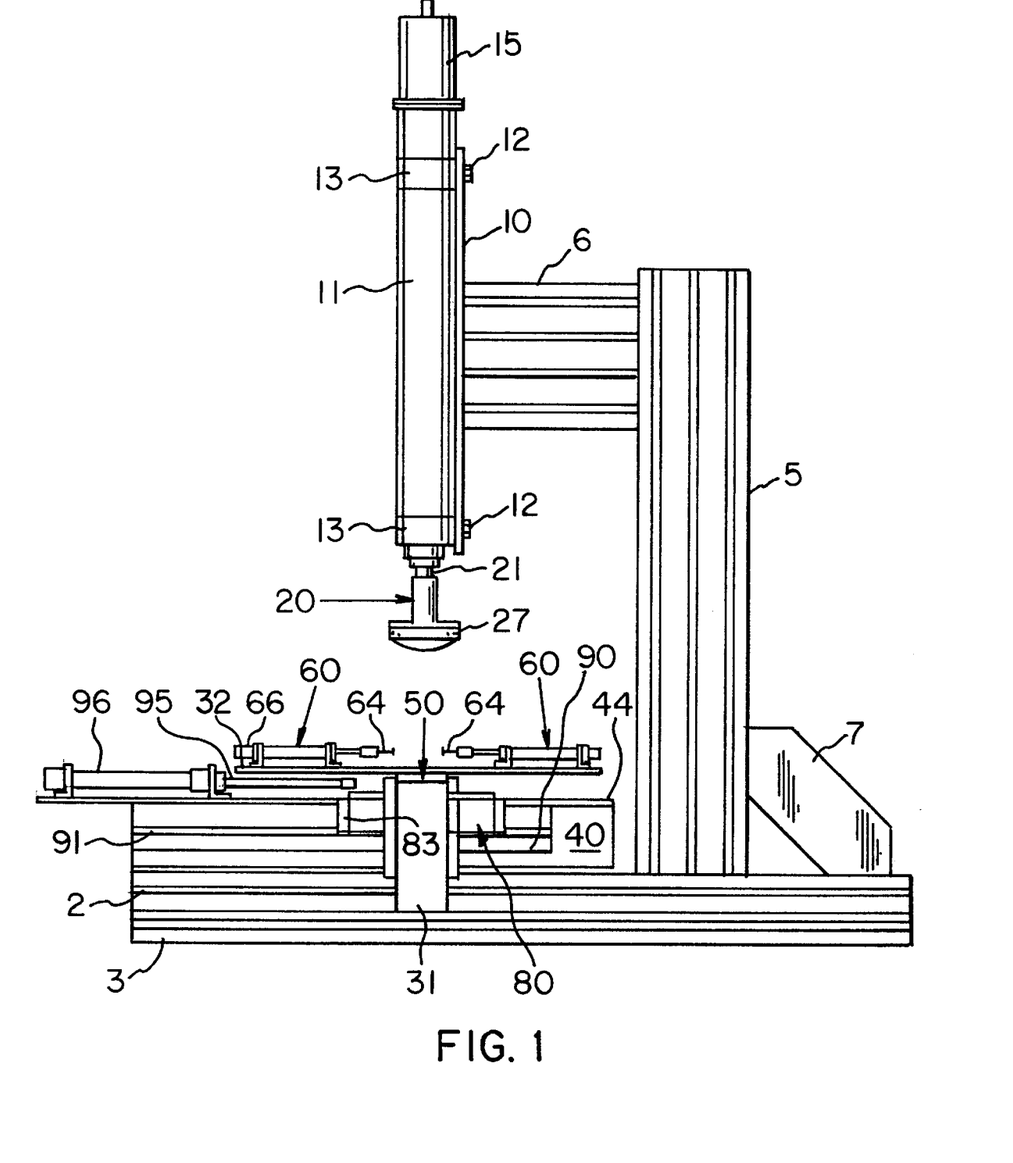
FIG. 1 is a side elevation of a laminating device according to the invention.
Figure 2:
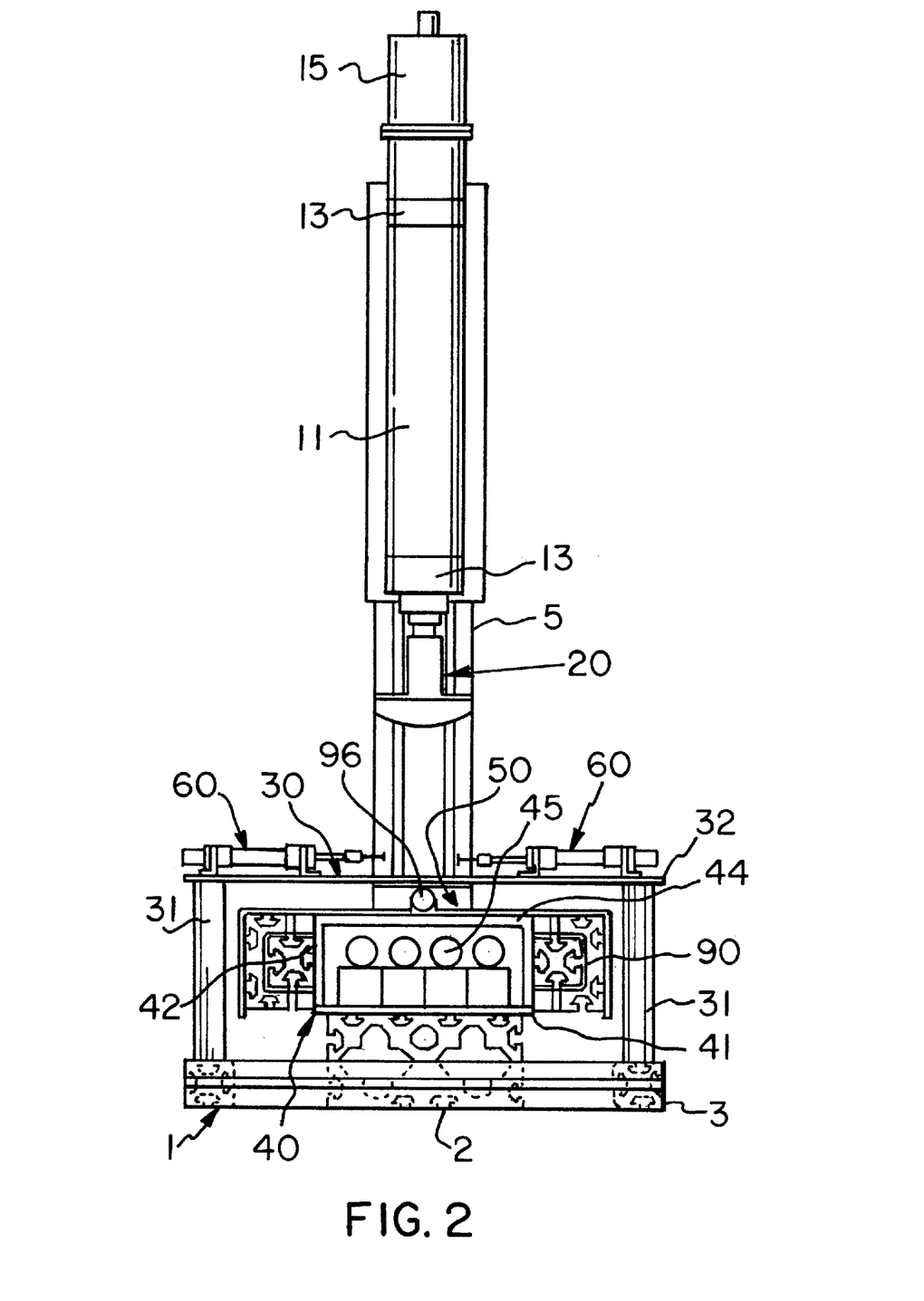
FIG. 2 is a front elevation of the device shown in FIG. 1.

With reference to FIGS. 1 and 2 of the drawings, the laminating device has an elongated base 1 having a raised central portion 2 and a pair of substantially parallel outer members 3 spaced from the central portion 2. A vertical column 5 extends upwardly from one end of the central portion 2 of the base 1. A substantially horizontal cross member 6 extends at a right angle from the upper end of the column 5. A corner support plate or gusset 7 extends between the upper surface of the raised central portion 2 of the base 1 and the rear of the column 5. The central portion 2, the outer members 3, the column 5 and the member 6 are aluminum extrusions although other constructs may be used for these elements if desired. A mounting plate 10 for a vertical cylinder 11 is fixed to the distal end of the cross member 6 and is substantially parallel to the vertical column 5. The mounting plate 10 is formed with a plurality of spaced holes which receive bolts 12 for collars 13 which hold the cylinder 11 on the mounting plate. A drive motor 15 is mounted on the upper end of the cylinder 11 to rotate a shaft 21 in the cylinder which is connected to a head assembly 20 to raise and lower the head assembly relative to the cylinder. The head assembly is described in detail hereinafter. The cylinder 11 may be a Model ETS 50 electric cylinder manufactured by the Automation Actuator Division of Parker Motion & Control located in Wadsworth, Ohio. It will be understood by those skilled in the art that a fluid cylinder can also be used to raise and lower the head assembly 20.

Optionally, an alignment fixture 30 is located above the base 1 and is supported by spaced support posts 31 which extend upwardly from the upper surfaces of the outer members 3. The alignment fixture 30 includes a substantially horizontal cylindrical table 32 having a circular opening 33 in its center to permit the movement of the head assembly 20 with the composite supported thereon. The details and the operation of the alignment assembly are explained in detail hereinafter in connection with FIGS. 6 and 7 of the drawings. In preferred embodiments, alignment means are unnecessary due to the precision of overall device tooling.

Figure 3:
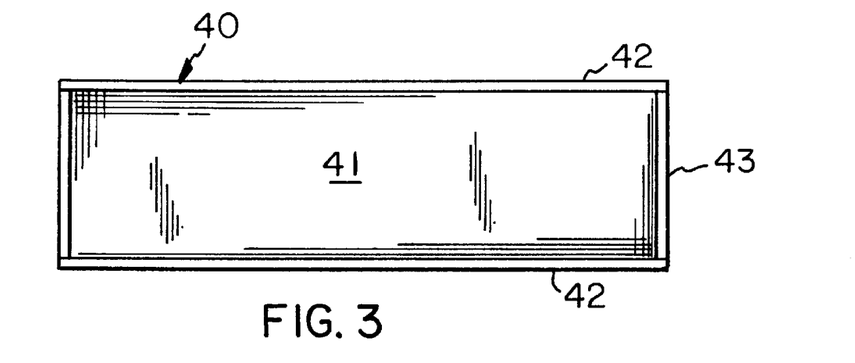
FIG. 3 is a plan view of the light box shown in FIG. 2.
Figure 4:
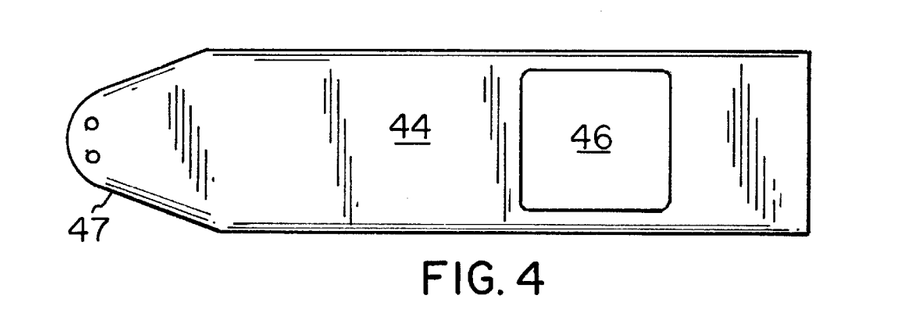
FIG. 4 is a plan view of the cover plate for the light box shown in FIGS. 2 and 3.

In one embodiment of the invention, an elongated light box 40 is supported on the raised central portion 2 of the base 1 as shown in FIG. 2 of the drawings. As shown in FIG. 3 of the drawings, the light box is a U-shaped rectangular box having a bottom member 41 attached to the upper surface of the raised central portion 2 of the base 1; upstanding side walls 42 and upstanding end walls 43. A cover plate 44 is fixed to the upper edges of the side walls 42 and the end walls 43. The cover plate is shown in FIG. 4 of the drawings and has an opening 46 formed therein and a rearward extension 47. The light box 40 contains four 18-inch bulbs 45 which emit light rays to evenly cure the entire adhesive film between the mating surfaces of the parts of the composite. The bulbs are selected so that the light rays emitted therefrom are in the portion of the electromagnetic spectrum which will evenly cure the adhesive to laminate the front and rear parts into a composite. Thus, the selection of the bulbs in the light box is dictated to a large extent by the composition of the specific adhesive which is used. During curing the parts to be laminated are held on the contact surface S of the head member 27 of the head assembly 20 in the manner described hereinafter. In order to ensure an even distribution of the light rays over the entire lower surface of the lower part during curing, the vertical axis of the opening 46 in the cover plate 44 of the light box 40 is ertically aligned with the vertical axes of the upper and lower arts. The operation of the light box is explained in detail hereinafter.

Figures 9, 10:
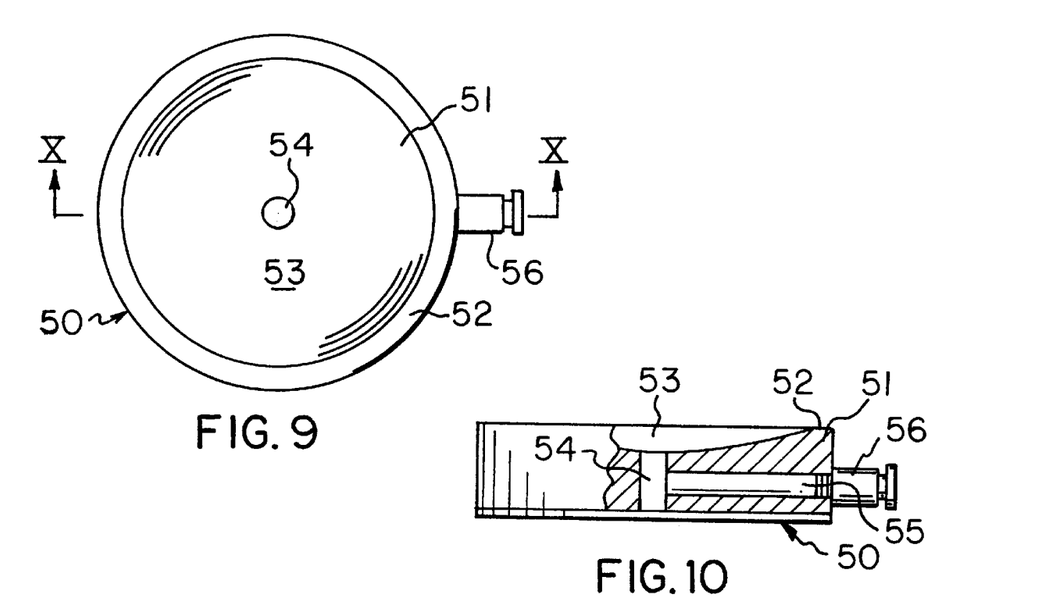
FIG. 9 is a plan view of the nest member.
FIG. 10 is a partial section on line X—X of FIG. 9.
Figure 16:
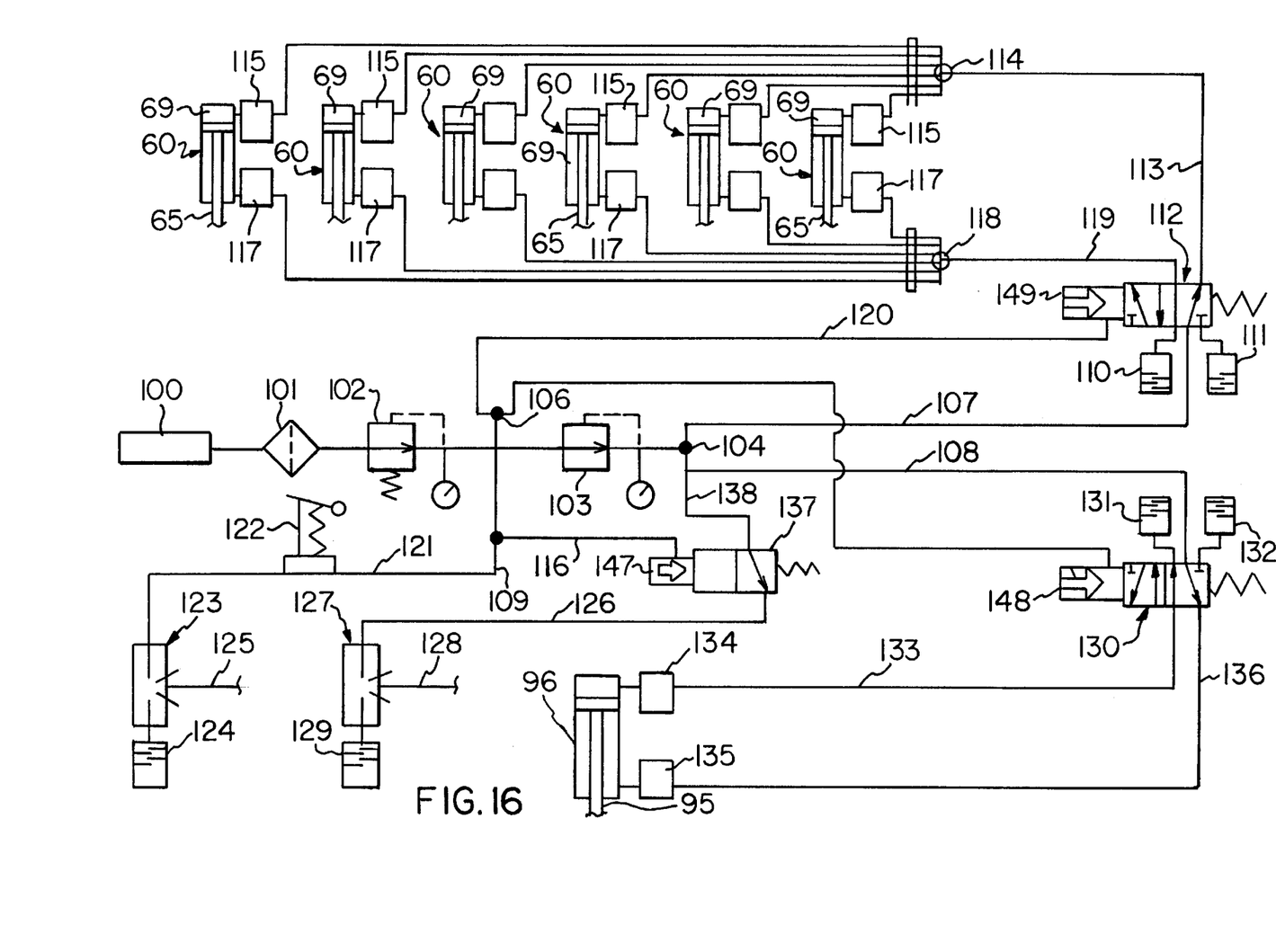
FIG. 16 is a pneumatic control circuit for the laminating device shown in FIGS. 1 and 2.
Figure 17:
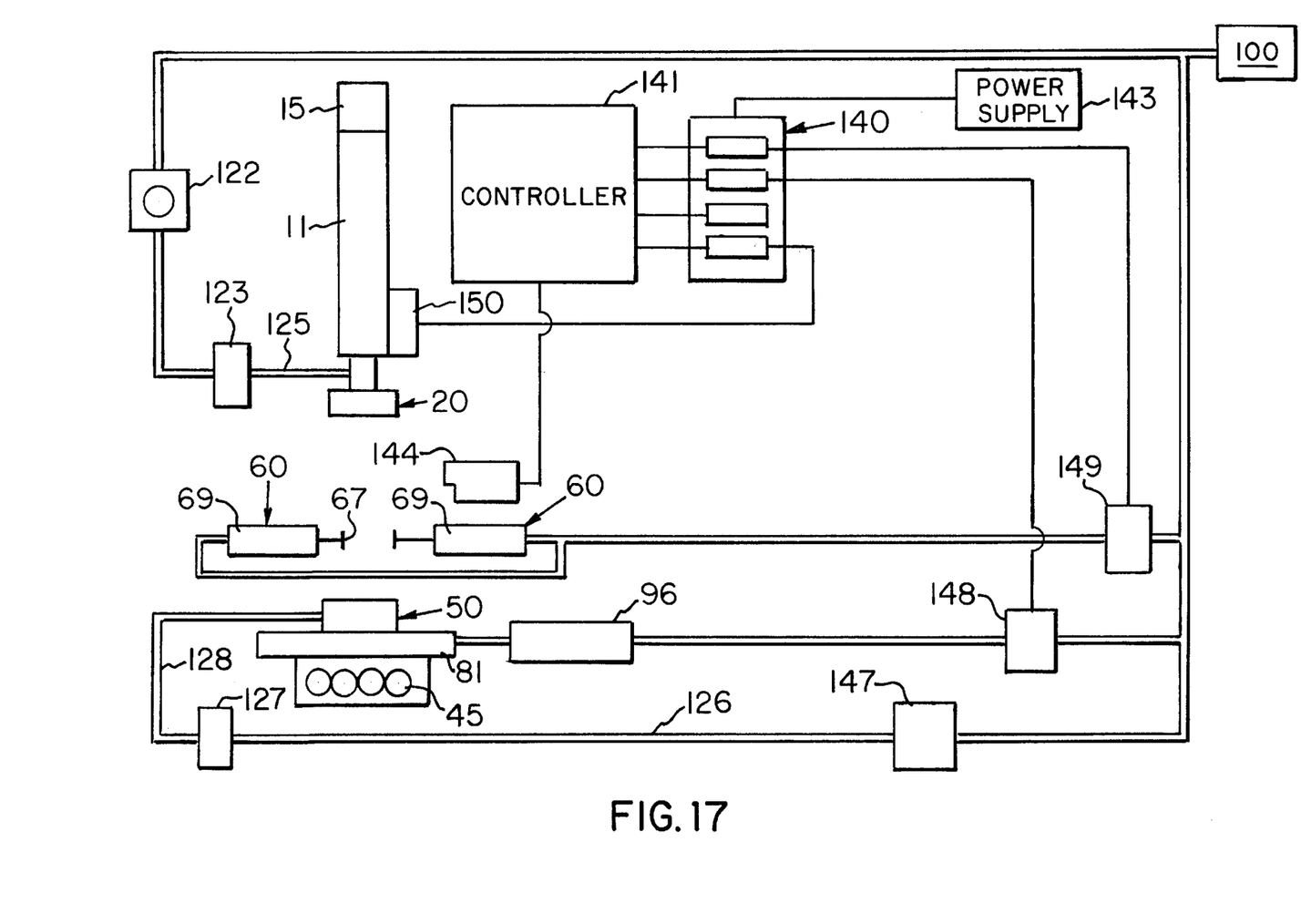
FIG. 17 is a schematic electric circuit for controlling the operation of the elements in the pneumatic circuit in accordance with the desired cycling schedule.

A lower nest member 50 is shown in detail in FIGS. 9 and 10 of the drawings and is adjustably supported on the upper surface of the top wall 82 of the shutter 81 of the shutter assembly 80. The nest member 50 has a cylindrical base 51 having an upper annular rim 52 and a central concave upper surface portion 53 within the rim to receive the convex bottom surface of the lower part of a composite. A central axial vacuum passage 54 is formed in the base of the nest member 50. The passage 54 is connected to a radial bore 55 having a connector 56 at its outer end for connection to a conduit 128 which is connected to a vacuum generator 127 as shown in FIGS. 16 and 17 of the drawings. A flexible magnetic sheet 57 may be attached to the lower surface of the base 51 of the nest member 50. The magnetic sheet permits infinite adjustment of the nest member 50 on the upper surface of the steel top wall 82 of the shutter assembly 80 to facilitate the vertical alignment of the axis of the nest member with the vertical axis of the head assembly 20. Preferably, however, the nest member is permanently mounted in an aligned position to the top wall of shutter assembly 50 via a suitable mounting means.

Figure 11:
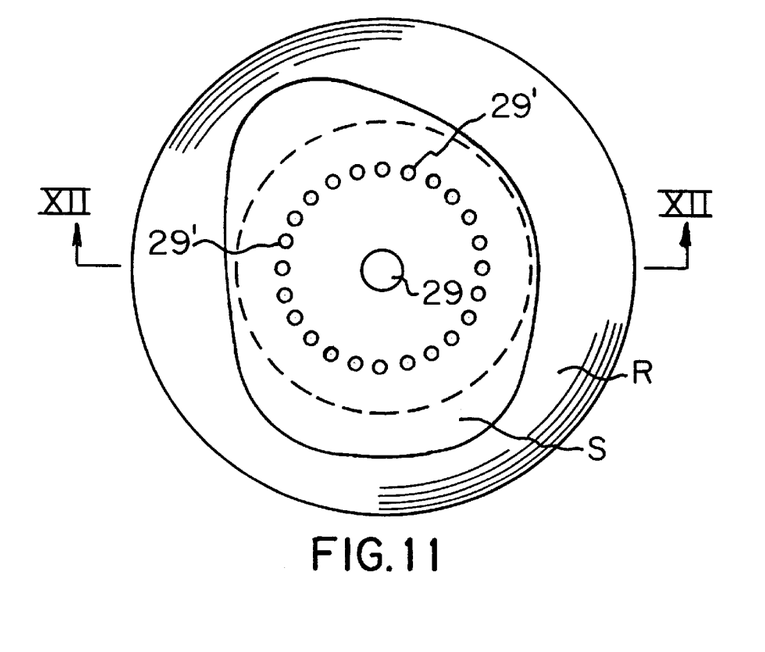
FIG. 11 is a bottom view of the head assembly.
Figure 12:
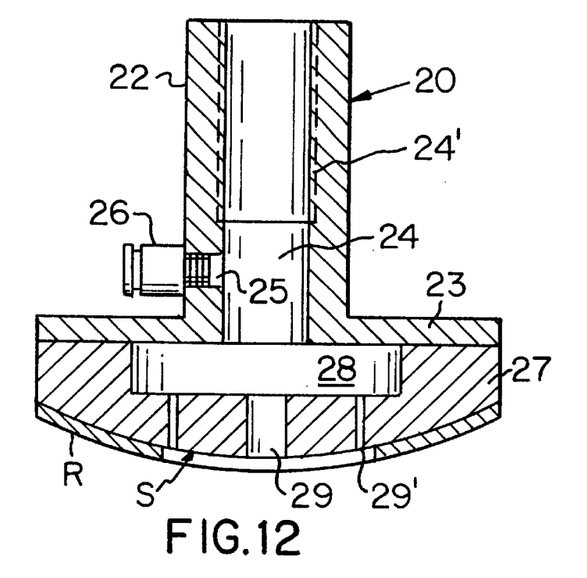
FIG. 12 is a section on line XII—XII of FIG. 11.

FIGS. 11 and 12 of the drawings show the head assembly 20 which consists of a T-shaped member having a hollow shank 22 and a base 23 integral with the lower end of the shank. The shank 22 is formed with an axial bore 24 having internal threads 24' at the upper end to receive the externally threaded end of the threaded shaft 21 in the cylinder 11. A radial bore 25 is connected with the lower end of the axial bore 24 and a pneumatic connector 26 is located in the outer end of the radial bore 25 for connection with the conduit 125 which is connected to a vacuum generator 123 as shown in FIGS. 16 and 17 of the drawings.

In one embodiment, a head member 27 having a flat rear surface and a central coaxial vacuum chamber 28 is attached to the lower surface of the base 23 by a layer of a silicone rubber, for example a silicone rubber available from Dow Corning. The head member 27 has a central axial passage 29 which is aligned with the axis of the axial bore 24 and a plurality of outwardly located radially spaced vertical passages 29' surround axial passage 29. The passages 29 and 29' extend between the vacuum chamber 28 and the contact surface S of the head member. A flexible ring member R having an opening with a peripheral shape substantially the same as the peripheral shape of the upper lens to be supported is attached to the contact surfaces of the head member 27 by an appropriate means.

Figure 13:
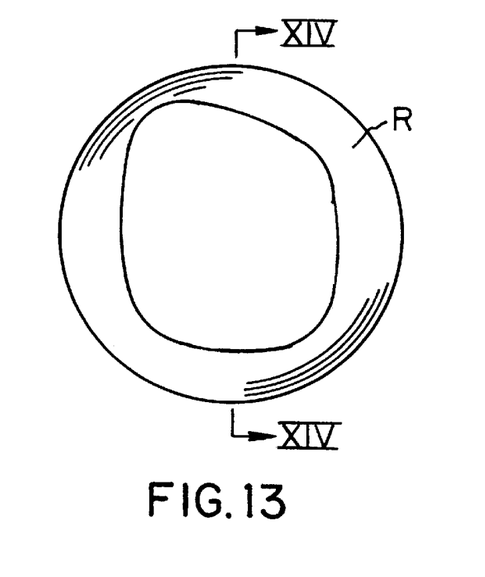
FIG. 13 is a plan view of a flexible shaped ring shown in FIG. 11.
Figure 14:
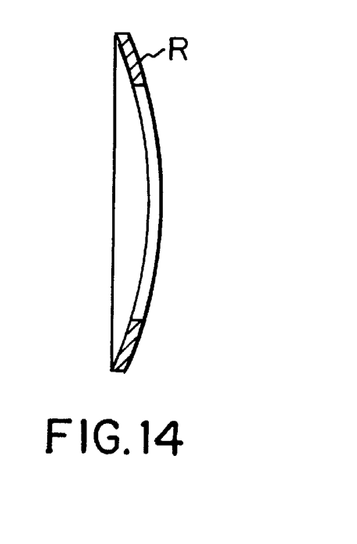
FIG. 14 is a section on line XIV—XIV of FIG. 13.

The flexible ring member R is generally made of a rubber or a thin flexible plastic material and is positioned on the contact surface S of the head member 27 so that when a part which has an edge with the same shape as the peripheral shape of the opening in the ring member R is located within the opening in the ring member on the contact surface of the head member 27, the axis of the part is aligned with the axis of the axial bore 24 of the head assembly 20. This assures that the axes of the upper part and the lower part will be properly aligned because the upper part and the lower part have their peripheral edges aligned before the adhesive is cured to form the upper and lower parts of the composite. Such alignment ensures that the axis of the composite is the aligned axes of the upper and lower parts.

The contact surface S of the head member 27 interfaces with the upper concave surface of the upper part which is firmly secured thereto by means of a vacuum. The curvature of the contact surface S of the head assembly 20 is substantially the same as the curvature of the concave surface of the upper part. The vacuum is provided at the contact surface S through the pneumatic connector 26; the radial bore 25; the axial bore 24; the vacuum chamber 28 and the passages 29 and 29' which are connected to the vacuum generator 123 by conduit 125 as shown in FIGS. 16 and 17 of the drawings. The flexible ring member R on the contact surface of the head member 27 ensures the proper positioning of the shaped upper part on the surface of the head member with the axis aligned with the axis of the axial bore 24.

Figure 6:
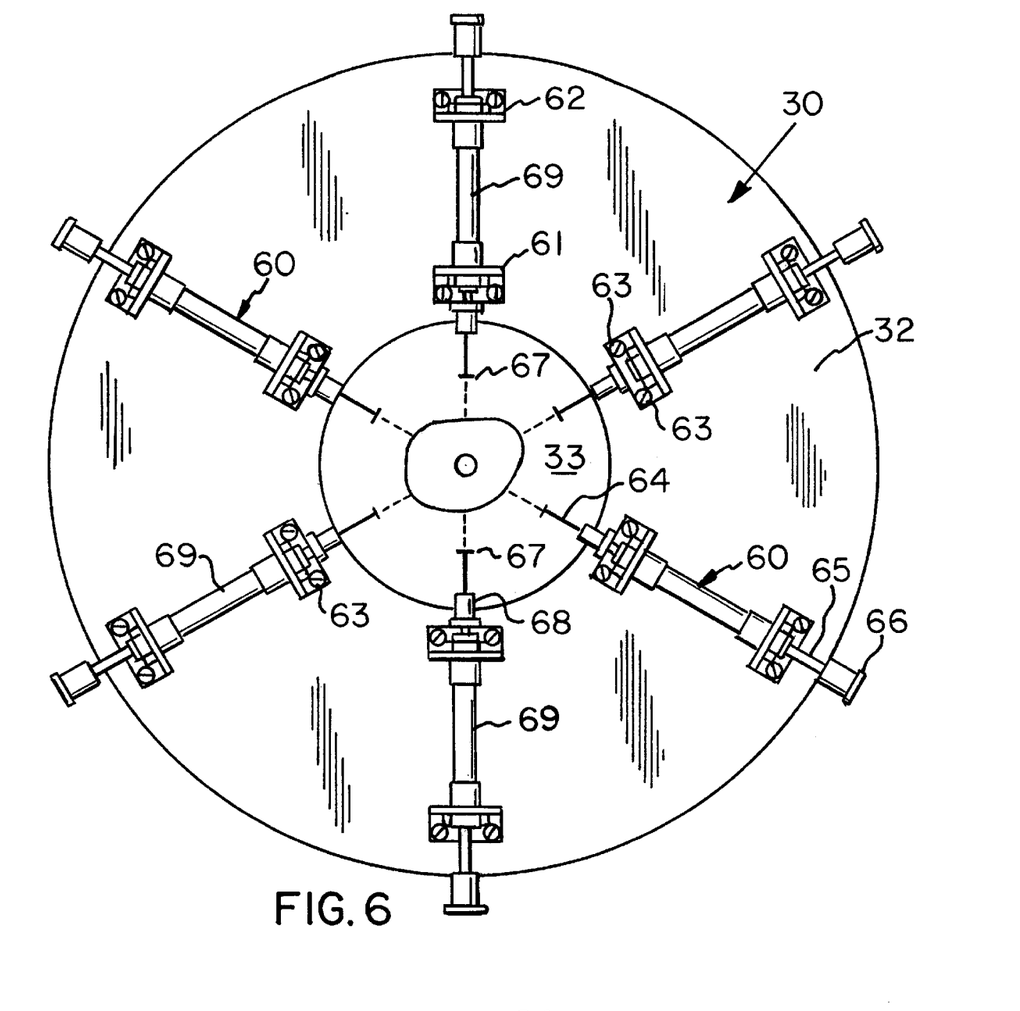
FIG. 6 is a plan view of the alignment fixture shown in FIGS. 1 and 2.
Figure 7:
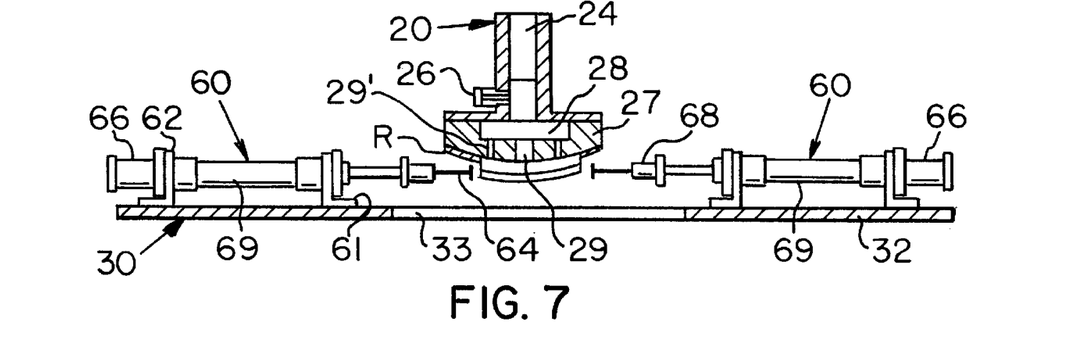
FIG. 7 is a vertical section through the alignment fixture and the head assembly in the raised position with a shaped composite on the head member.
Figure 8:
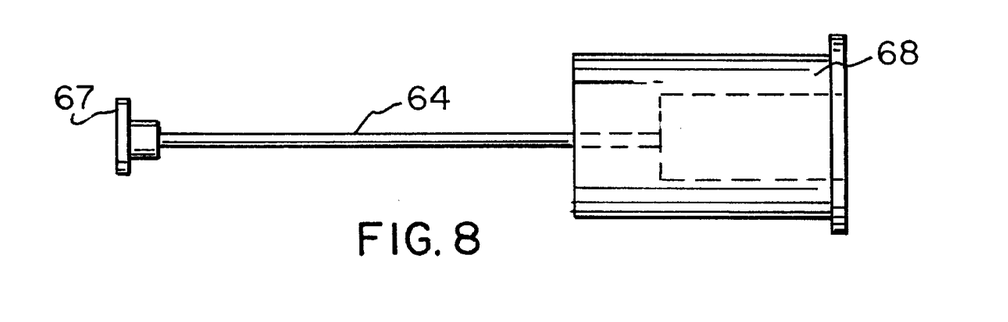
FIG. 8 is a rod with a contact disc thereon for use with the alignment fixture shown in FIGS. 6 and 7.

The alignment fixture 30 shown in FIGS. 6 and 7 of the drawings, which is optional, comprises the circular table 32 having the central opening 33 formed therein to receive the head assembly 20 and a composite supported thereon. A plurality of radially spaced substantially horizontal alignment assemblies 60 are mounted on the upper surface of the table 32 by spaced L-shaped mounting brackets 61 and 62 which are attached to the table by screws 63. As shown in FIG. 6 of the drawings, the alignment assemblies are radially spaced 6° around the circumference of the table 32 so that six assemblies are provided. Each alignment assembly has a horizontal pneumatic cylinder 69 mounted by the brackets 61 and 62. A reciprocal piston rod 65 extends through each pneumatic cylinder 69 and a threaded lock ring 66 is on the external end of the rod. With reference to FIG. 8 of the drawings, a Mylar edge contact disc 67 is carried on the inner end of a mounting rod 64 which is affixed to the inner end of the piston rod 65 by an internally threaded socket 68. The surfaces of the contact discs are adapted to gently contact the shaped edges of the upper and lower parts as shown in FIG. 7 of the drawings to laterally move the parts before the adhesive is cured so that a laminated composite is formed with the axes of the parts vertically aligned.

As will be understood by those skilled in the art the pneumatic cylinders 69 shown in FIGS. 6 and 7 of the drawings can be replaced by radially spaced vertical pneumatic cylinders in the nest member 50 having upwardly extending aligning pins with inwardly beveled contact surfaces to contact the edges of the two parts to move them laterally into axial alignment. Another arrangement for aligning the axes of the parts is an electric or pneumatic vibrator 150 which may be attached to the lower end of the cylinder 11 adjacent to the head assembly 20. The vibrator imparts a vibratory motion to the head assembly to align parts which are supported thereon. Manual vibration may also be utilized on the lower end of cylinder 11 for alignment purposes although the frequency is inconsistent.

Figure 5:
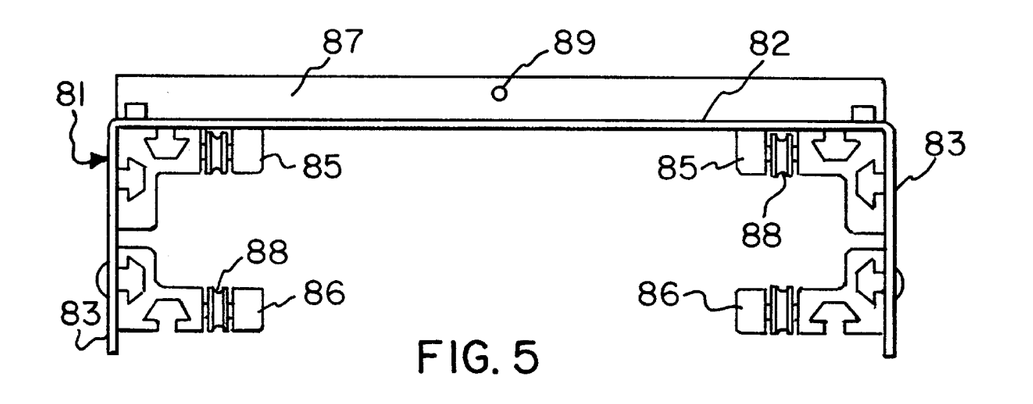
FIG. 5 is an end view of the shutter shown in FIG. 2.
Figure 15:
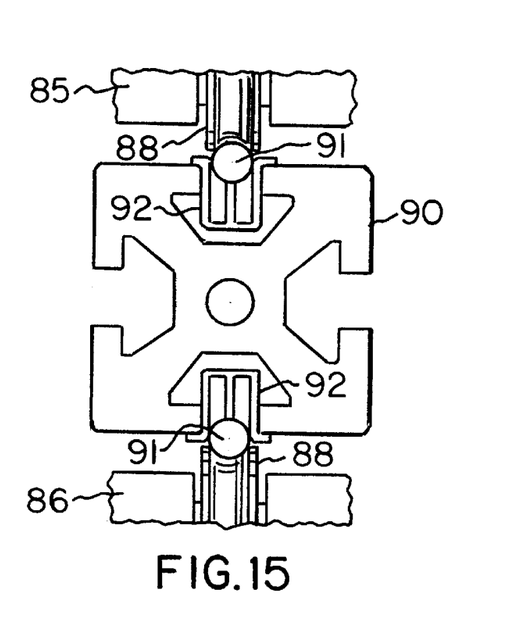
FIG. 15 is an end view of a shutter rail and a portion of the shutter shown in FIG. 5.

With reference to FIGS. 5 and 15 of the drawings, a shutter assembly 80 for opening and closing the opening 46 in the cover plate 44 of the light box 40 includes a U-shaped shutter 81 having a plurality of rollers 88 which travel along horizontal steel rods 91 which are supported on horizontal rails 90 attached to the outer surfaces of the side walls 42 of the light box 40 in the manner shown in FIGS. 2 and 15 of the drawings. The shutter assembly 80 is preferably made of steel and comprises the inverted U-shaped shutter 81 having a top wall 82 and spaced side walls 83 extending downwardly therefrom. A vertical cross plate 87 extends upwardly from the upper surface of the top wall 82 of the U-shaped shutter and a hole 89 is drilled in the horizontal center of the plate to receive the distal end of a piston rod 95 of pneumatic shutter cylinder 96 which is mounted on the rearward extension 47 of the cover plate 44 of the light box 40. With additional reference to FIG. 5 of the drawings, the U-shaped shutter 81 has a bearing block 85 located at each of the four upper interior corners and a bearing block 86 located at each of the four lower interior ends of the side members 83. Each bearing block has a roller 88 rotatably mounted thereon which rides along a round steel rod 91 attached to a rail 90 attached to the exterior surface of a side wall 42 of the light box 40 by clamp members 92, as shown in FIG. 15 of the drawings.

The pneumatic shutter cylinder 96 moves the shutter 81 along the rods 91 relative to the light box 40. When the pneumatic cylinder 96 retracts the rod 95, the composite lens which is held on the contact surface S of the head member 27 by the vacuum formed therein is evenly exposed to the curing light rays emitted from the bulbs 45, which rays pass through the opening 46 in the cover plate 44 of the light box 40. The top wall 82 of the shutter 81 normally covers the opening 46 in the light box cover plate 44 to prevent exposure of. the adhesive to light rays emanating from the bulbs 45 located in the light box 40. Extension of the rod 95 out of the pneumatic cylinder 96 moves the shutter 81 relative to the cover plate 44 of the light box 40 to close the opening 46. An electric shutter can also be used.

It is essential that the light rays which pass through the opening 46 in the top wall 44 of the light box 40 contact the complete surface area of the lower lens in order to evenly cure the thin film of adhesive which is evenly spread over the mating surfaces of the lenses. An uneven distribution of light rays will produce uneven curing of the adhesive which is unacceptable because it renders the composite unfit for further use.

When the device is used for laminating opaque parts, an adhesive which is cured by light rays cannot be used because the light rays cannot pass through the opaque part to the adhesive film. Therefore, the light box 40 may be replaced by a heat source, such as an infrared heater. Heat cures can also be used on transparent parts. If desired, a source of heat for curing adhesives may be included in the device with the light box and the desired curing mechanism will be selected by the operator. Heat sources other than infrared may also be utilized. The resin used to laminate opaque parts can be an art recognized, thermally curable resin based adhesive of which there are many commercially available.

The pneumatic circuit for operating the fluid cylinders in the laminating device is shown in FIG. 16 of the drawings. The pneumatic circuit is connected to a source 100 of pressurized plant air. The source 100 is connected to a filter 101 and pressure regulators 102 and 103 which are connected to branch conduits 107 and 108 by a T connection 104. Branch conduit 107 is connected to the inlet of a solenoid operated spring-loaded reversible valve 112 having mufflers 110 and 111. The reversible valve 112 is connected to a conduit 113 which is connected to a manifold 114. The manifold 114 has a plurality of ports which are in flow communication with the head ends of the pneumatic cylinders 69 in the alignment assemblies 60. A flow control regulator 115 is connected in the conduit between each port in the manifold 114 and the head end of each pneumatic cylinder 69. The rod end of each pneumatic cylinder 69 is connected by a conduit having a flow control regulator 117 to a manifold 118 which is connected through a conduit 119 to the reversible valve 112. The flow control regulators 115 and 117 moderate the flow of air to the cylinders 60 to cushion the operation of the cylinder. The reversible valve 112 is connected by a conduit 120 to a connection 106 for a conduit 121. Conduit 121 is connected to a conduit 116 through a connection 109 and to a vacuum generator 123. A manual control switch 122 is located in conduit 121 so that the operator can control the vacuum created by the vacuum generator 123 at the contact surface S of head member 27 on the head assembly 20. The vacuum generator includes a muffler 124. The vacuum generator 123 is connected by a conduit 125 to the connector 26 in the radial bore 25 on the head assembly 20.

A second vacuum generator 127 is connected to a solenoid operated spring loaded control valve 137 by a conduit 126. The vacuum generator 127 has a muffler 129 and a conduit 128 connects the vacuum generator to the connector 56 in the radial bore 55 in the nest member 50. The control valve 137 is connected to connector 104 by a conduit 138.

Pressurized air flows through the conduit 108 to a spring loaded reversible valve 130 having mufflers 131 and 132. The reversible valve 130 is connected to the head end of the pneumatic cylinder 96 in the shutter assembly 80 by a conduit 133 having a flow regulator 134 therein. The reversible valve 130 is connected to the rod end of the cylinder 96 by a conduit 136 having a flow regulator 135 therein.

It will be seen that the flow of pressurized air from the source 100 controls the operation of the pneumatic alignment cylinders 69; the shutter assembly pneumatic cylinder 96; the vacuum at the contact surface S of the head member 27; and the vacuum at the concave portion 53 of the nest member 50. The sequential control of these elements and their functions in the operating cycle of the laminating device is determined by a schedule according to a controller 141 which is shown in FIG. 17 of the drawings. The controller 141 is an electronic device which issues commands to relays to control the various system functions. The controller program is stored in a non-volatile memory and cannot be accidentally erased when the controller is shut off. When the controller is powered up or is reset, the program first raises the head assembly 20 to the retracted home position shown in FIG. 1 of the drawings.

As shown in FIGS. 16 and 17 of the drawings, the operation of the pneumatic circuit is controlled by electric solenoids which operate the spring loaded valves. The solenoids are electrically connected to individual relays in a relay box 140. The relays are electrically connected to the controller 141 and to an electric power supply 143. The controller 141 also operates the drive motor 15 in the cylinder 11 and is electrically connected to a safety photocell 144 which is located below the head assembly 20 and above the alignment fixture 30. The safety photocell 144 is located adjacent to the vertical axis of travel of the head assembly 20 to prevent the head assembly from moving downwardly to pick up a lower part from the nest member 50 when the operator's hand is located between the head assembly 20 and the nest member 50. The electric circuit also includes magnetic switches at the upper and lower limits of travel of the head assembly 20 to stop the head assembly at the home position which is the start position of each laminating cycle performed by the device. The solenoids 147, 148, and 149 are respectively located in the spring loaded control valves 112, 130 and 137 to shift the valve position against the force of the spring to control the flow of air to the nest vacuum generator 127, the aligning cylinders 69 and the shutter cylinder 96. The head vacuum generator 123 is controlled by the manual switch 122 which is located in the line between the plant air source 100 and the head vacuum generator 123. The various solenoids and relays are purchased items which are well-known to those skilled in the art and form no part of the present invention.

The control diagram shown in FIG. 17 of the drawings also includes an electric or pneumatic vibrator 150 which is connected to a relay in the relay box 140. The vibrator 150 is mechanically attached to the outside of the cylinder 11 adjacent to the lower end. When one of electric current or air is supplied to the vibrator 150, it causes the head assembly 20 and the parts which are held on the contact surface S of the head member 27 to vibrate to assist in the alignment of the axes of the parts. The vibrator may replace the alignment fixture 30 under circumstances dictated by the viscosity of the film of adhesive on the mating surfaces of the parts. A manual vibration may also be applied to the head assembly 20 to assist in aligning the parts although manual alignment does not provide the consistent frequency of vibration which is created by the vibrator 150. When the device is to be used to laminate opaque parts the light box 40 will be replaced by a radiant heater which is electrically connected to the controller 141 through a relay in relay box 140.

Suitable pneumatic cylinders and valves are manufactured by FESTO located in Hauppauge, N.Y.; suitable power cylinder vibrators and controllers are manufactured by Parker Motion & Control located in Wadsworth, Ohio; and suitable shutter assemblies are manufactured by Item Products, Inc. located in Houston, Tex.

In accordance with the best mode, the lamination process for a composite lens is initiated by placing a lower lens in the lower nest member 50 and an upper lens into head assembly 20. The lenses are held in position by vacuum created by the vacuum generators 127 and 123, respectively. An effective amount in the form of a puddle of a curable adhesive composition is placed on the concave upper surface of the lower lens. The curable adhesive composition which is used in the device for the fabrication of laminated electrochromic lenses contains effective amounts of suitable monomers and a suitable initiator and serves the dual function of forming an ion-conducting polymer and a laminating adhesive. A suitable adhesive material that may be used is disclosed in U.S. Pat. No. 5,327,281, granted Jul. 5, 1994. This adhesive is utilized in the manufacture of laminated eyeglasses because the lenses are transparent. Also, see U.S. Pat. No. 5,520,851 and 5,471,338, which are directed to laminated electrochromic lenses suited to the instant invention.

The vacuum in the nest member 50 is controlled by the spring loaded valve 137 and the solenoid 147 and the vacuum at the contact surface S of the head member 27 is created by the vacuum generator 123 and is controlled by the operator using the manual switch 122. The head assembly 20 is lowered by the drive motor 15 to position the bottom convex surface of the upper lens a small predetermined distance from the top concave surface of the lower lens and delays in this position for approximately 10 seconds. This distance is equivalent to the desired thickness of the adhesive layer of the laminate. When the upper and lower lenses are properly vertically positioned, the concentricity of the spherical mating surfaces establishes a uniform gap or a finite distance between the mating surfaces. The uniform gap or finite distance is necessary to avoid optical distortion and the approximate 10 second delay permits the curable adhesive composition to spread evenly throughout the entire uniform gap by capillary and/or surface tension forces. The lenses adhere to each other because of the adhesion created by the surface tension film and/or capillary forces of the adhesive precursor between the lenses. The vacuum on the nest member 50 is released and the head member 27 is retracted in cylinder 11 by drive motor 15 to raise the composite attached thereto. Optionally, the upward movement is interrupted with the composite located in the lateral plane which includes the centers of the contact discs 67 on the pneumatic cylinders 69. If the lenses are sufficiently aligned due to the tooling of the device, which is preferred, this alignment step is unnecessary.

The operation of the cylinders 69 in the alignment fixture 30 shown in FIGS. 6 and 7 of the drawings is controlled by the spring loaded control valve 130 and the solenoid 149. The piston rods 65 extend from the pneumatic cylinders 69 until the surfaces of the discs 67 contact the peripheral edges of the lenses to laterally align the lenses. The extension distance of each piston rod 65 from its pneumatic cylinders 69 is preset in accordance with the peripheral shape of the lenses so that all of the contact discs 67 simultaneously gently touch the peripheral edges of both lenses as is best shown in FIG. 7 of the drawings to align the optical axes of the lenses.

After the lenses are aligned, the contact discs 67 are withdrawn by the piston rods 65 of the cylinders 69. The drive motor 15 raises the head assembly to a predetermined curing height and the composite is optionally vibrated by the vibrator 150 or manually to further assist in obtaining proper alignment of the center lines of the lenses. The curing height is a height which ensures even exposure of the complete surface to be cured to curing energy. The movement of the shutter rod 95 to move the shutter 81 and the nest member 50 to open the opening 46 in the cover plate 44 to expose the composite and the film of precursor adhesive to the light rays from the bulbs 45 in the light box 40 is controlled by the solenoid 148. The composite is exposed to the light rays for an effective period, preferably for at least about 0.1 minute, more preferably from about 0.5 to about 20 minutes and still more preferably for about 1.0 to about 5.0 minutes to cure the adhesive and retain the mated lenses together as a laminated composite. When the adhesive is cured, the shutter assembly piston rod 95 is extended from the pneumatic cylinder 96 to close the opening 46 in the light box cover plate 44. The vacuum is released from the head assembly by the operator using the manual switch 122 and the composite is removed from the head assembly.

The method of operating the laminating device is initiated by depressing the cycle start button, which instructs the controller to begin issuing commands to the device. The first command lowers the upper lens until the bottom surface of the upper lens is a predetermined distance above the top surface of the lower lens and delays for an effective time, preferably for approximately 10 seconds. A uniform gap or finite distance is established between the mating surfaces of the lenses, and the adhesive spreads on the surfaces of the lenses by capillary action to form a thin film which evenly substantially fills the entire gap. The next command releases the vacuum in the nest member 50 and instructs the drive motor 15 to retract the head member 27 to raise the composite which is held thereon by the vacuum upwardly to a predetermined curing height or into the same lateral plane as the centers of the contact discs 67 in the alignment fixture 30, if this alignment means is used. At this point, the lower lens is supported by the surface tension and/or capillary force of the curable adhesive composition so as to be suspended from the top lens.

If used, the pneumatic cylinders 69 are actuated by the controller 141, the solenoid 149 and the spring loaded control valve 112 to move the Mylar contact discs 67 inwardly toward the peripheral edges of the lenses on the contact surface S of the head assembly 20 by extending each of the piston rods 65 a preset distance from the cylinders 69. The faces of the Mylar discs 67 contact the peripheral edges of both lenses in accordance with a preset pattern to properly align the lenses. The length of travel of the piston rods 65 is set so that the contact surfaces of the discs 67 gently touch the peripheries of the lenses to align the optical axes of the lenses. After a slight pause, the piston rods 65 retract and the drive motor 15 raises the head assembly and the parts on the head member to a predetermined curing height. The controller 141, the solenoid 148 and the control valve 137 actuate the shutter cylinder which retracts the rod 95 to move the shutter 81 and the nest member 50 which is supported thereon to open the opening 46 in the cover plate 44 of the light box 40 to expose the suspended lenses to the curing rays of the bulbs 45 for the desired period of time. When the curable adhesive composition between the lenses is cured, the controller instructs the piston 96 to close the opening 46 in the cover plate 44. The vacuum is manually shut off by the switch 122, and the cured composite lens is removed from the contact surface S of the head member 27 by the operator for further processing.

It will be understood by those skilled in the art that the terms "upper part", "upper lens", "first member", "lower part", "lower lens" and "second member" are used herein for convenience only. The device laminates both opaque parts and clear lenses.

While different embodiments of the invention are described in detail herein, it will be understood by those skilled in the art that additional modifications and alternatives to the described embodiments can be developed in light of the overall teachings of the disclosure. Accordingly, the particular embodiments shown in the drawings are illustrative only and are not limiting as to the scope of the invention which is to be given the full breadth of the appended claims and any and all equivalents thereof.

We claim:

1. A method for laminating an upper part and a lower part, wherein said upper and lower parts have opposed complementary mating surfaces, which method comprises: a) retaining said lower part on a lower holder with its mating surface facing upwardly; b) retaining said upper part on an upper holder coaxially with said lower part with its mating surface facing the mating surface of said lower part; c) placing an effective amount of an adhesive composition between the mating surfaces of the parts; d) bringing said upper part and said lower part toward each other until the mating surfaces of the parts are spaced so as to allow said adhesive composition to spread between the mating surfaces of said parts; e) ceasing retention of said lower part on said lower holder; f) suspending said lower part from said upper part via surface tension and/or capillary force of said adhesive composition; and g) curing said adhesive composition by a curing mechanism, wherein curing occurs while the lower part is suspended from the upper part, thereby forming a composite.

2. The method of claim 1, wherein said first member and said second member are transparent lenses.

3. The method of claim 1, wherein said composite is an electrochromic device.

4. The method of claim 3, wherein said adhesive composition forms an ion-conducting polymer upon curing.

5. A method for laminating a first member and a second member having opposed mating surfaces, which method comprises: retaining said first member on a first holding device; retaining said second member coaxially above said first member on a second holding device; placing an effective amount of a curable adhesive composition between the mating surfaces of said first member and second member; moving said first and second members toward each other until said adhesive composition spreads between the mating surfaces of said first member and said second member; releasing said first member from said first holding device; raising said second member or lowering said first holding device, thereby suspending said first member from said second member via surface tension and/or capillary forces of said curable adhesive composition; and curing said curable adhesive composition to form a laminated composite.

6. The method of claim 5, wherein said laminated composite is an electrochromic device.

7. The method of claim 5, wherein said first and second members are lenses for the formation of a composite eyeglass lens.

* * * * *